No. 845,285. PATENTED FEB. 26, 1907.
J. F. WITTEMANN.
APPARATUS FOR DISTILLING.
APPLICATION FILED FEB. 14, 1895. RENEWED JAN. 25, 1907.
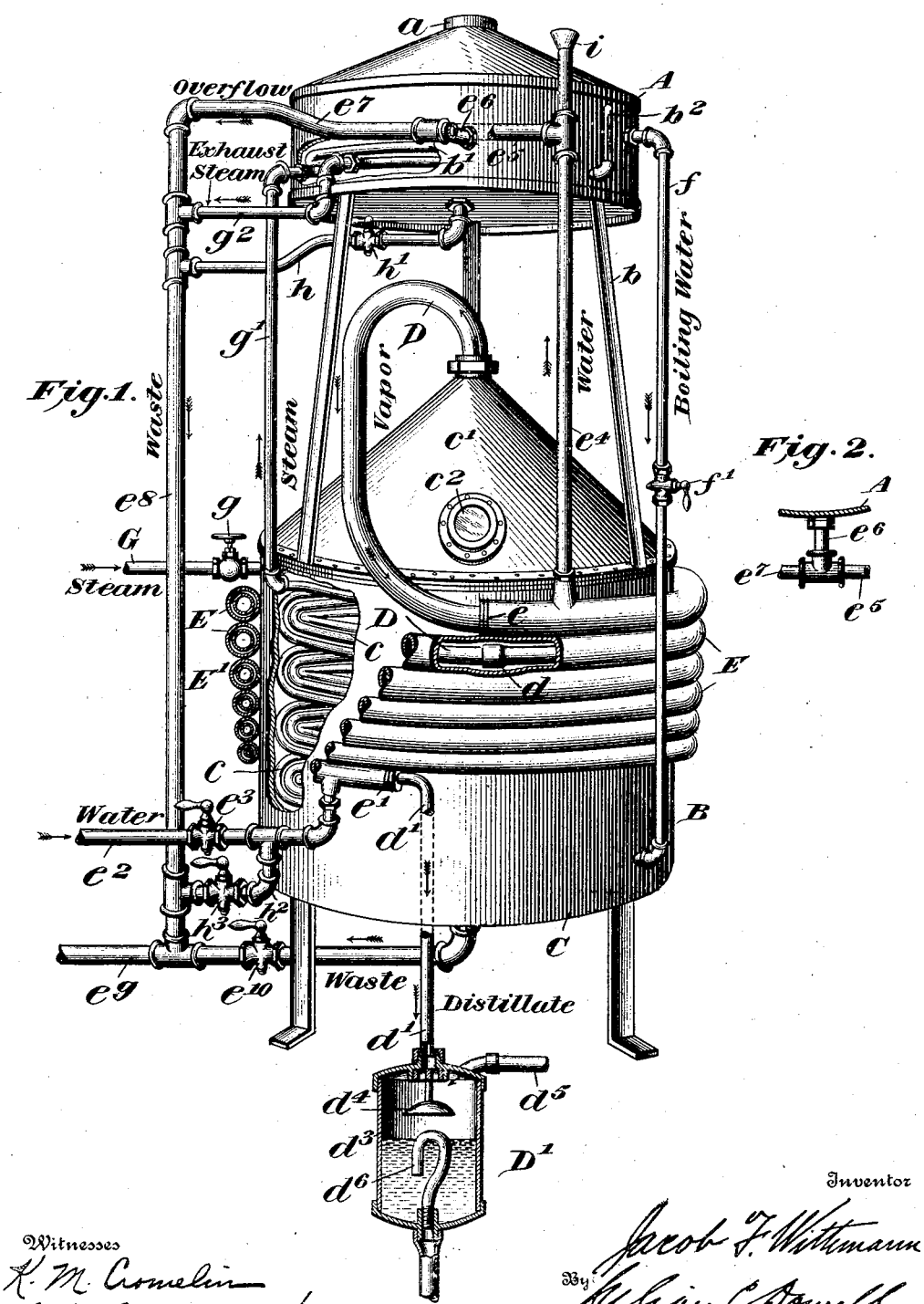

UNITED STATES PATENT OFFICE.

JACOB F. WITTEMANN, OF BROOKLYN, NEW YORK, ASSIGNOR TO WITTEMANN BROTHERS, OF NEW YORK, N. Y., A FIRM.

APPARATUS FOR DISTILLING.

No. 845,285.      Specification of Letters Patent.      Patented Feb. 26, 1907.

Application filed February 14, 1895. Renewed January 25, 1907. Serial No. 354,087.

*To all whom it may concern:*

Be it known that I, JACOB F. WITTEMANN, a citizen of the United States, residing at Brooklyn, in the county of Kings and State of New York, have invented certain new and useful Improvements in Apparatus for Distilling; and I do hereby declare the following to be a full, clear, and exact description of the invention, such as will enable others skilled in the art to which it appertains to make and use the same.

This invention relates to apparatus for distilling, particularly for distilling water for mineral waters, high-grade ginger-ales, and other beverages.

The primary object of my invention is to provide means whereby the water may be first purified, then evaporated, then recondensed, then recooled and sterilized in one continuous operation, furnishing at the same time boiling water which may be used for feeding a steam-boiler and for other purposes, thereby materially reducing the cost of production. Other objects are to render the water not only free from all organic and mineral matter or gases which are contained in more or less undesirable proportions in all spring, well, or river waters, but also to prevent the absorption of metallic matters from the necessary condensing-surfaces, to free the water from all organic matter and from the gases arising therefrom, which are undesirable, often dangerous, and liable to produce precipitation in the water or beverages prepared from the same.

Further objects of the invention are to produce pure water ready for immediate use—namely, substantially as cool as the original water—without additional cost for cooling mediums, to prevent the distilled water from reabsorbing the surrounding air, which is proved to be the vehicle of most disease germs, and particularly the air of workshops, to obtain an absolutely soft water—a condition as valuable as absolute purity—and to provide means by which the heat contained in the vaporized water may be reabsorbed and used over again, so as to economize in the fuel needed for distilling and other purposes.

With these and other objects in view the invention consists in the improved apparatus, substantially as hereinafter described and then defined in the claims at the end of the description.

In the accompanying drawings, which form a part of this specification, I have illustrated a preferred form of apparatus embodying my invention which is the subject of the present application, the improved method herein described being the subject of a divisional application, filed September 8, 1900, Serial No. 29,398. Figure 1 is a general perspective view of said apparatus with parts broken away, and Fig. 2 is a detail plan view of the connection between the feed-water pipe and the boiling-pan.

In the form of apparatus shown the letter A designates a boiling-pan having an opening $a$ at the top thereof for the escape of gases and of sufficient area to allow a partial evaporation of the heated body of water contained therein, so as to throw off all organic and other gases either contained in said water or created by the destruction of solid organic or mineral matter contained in the same, said opening in the pan being also to permit the water to be oxidized during the boiling process by the ebullition or bubbling up and separation of the particles of water, so as to contact with the air, in order to prevent the remaining purified water from being flat when vaporized and condensed. This pan may be supported above the still B by the legs $b$ or otherwise and is provided interiorly with one or more steam-coils $b'$ for heating the water therein and may have a thermometer $b^2$ communicating with said water, so that the temperature may be readily ascertained.

The still B is supported in any approved manner, and may comprise a vaporizing-retort C, having a series of preferably flat coils of pipe $c$ located within the same and arranged above and connected to each other for the purpose of vaporizing the water which surrounds said coils the said retort having preferably a dome $c'$ of conical formation, which may be provided with a bull's-eye or other suitable opening $c^2$ for ascertaining the height of the water in the retort and with a condensing-pipe D, secured to the dome $c'$ and extending downwardly and coiling around said retort in the form of a sprial. This condensing-pipe may taper, as indicated, and be composed of convenient lengths of pipe of gradually-reduced sizes properly fitted or butted into each other, as at $d$, and provided with a coil or pipe E, which surrounds said condensing-pipe D for condensing the vapor and cooling the resulting water contained in said condensing-pipe, the said coil E being preferably provided with stuffing-boxes $e$ $e'$ at its ends for securing a tight and expansive joint where it connects with the coil D, though any other suitable connections may be employed, if preferred, the whole thus forming a condenser E'.

The condensing coil or pipe D may be properly centered within the coil E by suitable means and is preferably made of pure tin to prevent the reabsorption of metallic matter from the condensing-surface, other than metallic surfaces being more or less impracticable. As it is well known that water-vapors have the highest possible absorbing qualities, they or the resulting recondensed water will gradually dissolve and absorb all except a few of the precious metals and pure tin, and for this reason I prefer to employ a condensing coil or pipe of this material, though other material may be adopted, if desired. This coil or pipe D may have its lower end $d'$ connected to a suitable saturating-receiver D', in which is sterilized air or any other suitable gas to be absorbed by the distilled water, thereby preventing said water from absorbing impure surrounding air, though, if preferred, the distilling apparatus may be placed in a room supplied with sterilized air or any other suitable gas instead of employing a separate saturating-receiver. The receiver D' preferably comprises a closed casing $d^3$, having a distributer $d^4$ for dividing the condensed water as it enters said receiver, so as to cause it to more thoroughly mix with the air or gas which may be introduced into said receiver through the pipe $d^5$, the latter being connected to any suitable source of supply. Within the casing may be arranged a bent pipe $d^6$ of sufficient length to retain the water at a fixed height, but which will permit the liquid to flow therefrom when the liquid rises above the bend in said pipe. Instead of this pipe, however, any other suitable means may be employed for conveying the water from the receiver or any number of saturating-receivers may be employed to cause the liquid to pass successively through each of the same.

The water-pipe $e^2$ is provided with a suitable valve or cock $e^3$ and has one of its ends connected to the source of supply, while its other end is connected to the coil E, through which the water may pass. Extending upwardly from the coil E is a pipe $e^4$, having a branch $e^5$ communicating at coupling $e''$ with a pipe $e^6$, through which the water flows into the boiling-pan after it has been heated by passing through said coil E. Communicating with the pipe $e^5$ is an overflow-pipe $e^7$, having an outlet somewhat higher than the connection $e^6$ with the boiling-pan, so that any surplus water may be conveyed by the pipe $e^7$ to the pipe $e^8$ and out of the waste-pipe $e^9$, which pipe may have one of its ends connected to the retort C and may be provided with a cock $e^{10}$ to permit said retort to be cleansed. This construction maintains the water in the boiling-pan at a proper height at all times. At $f$ is a pipe provided with a cock $f'$ and communicating at one end with the boiling-pan A and at its lower end with the retort C for supplying water thereto, the said supply of water to the retort controlling the supply of water to the boiling-pan by preventing more water from entering said boiling-pan than can be vaporized in the retort C. That the flow through the pipe $e^5$ may not vary in volume, the valve $f''$ may be adjusted to vary the flow through the pipe $f$ to the still without causing any difference in the water-level in the boiling-pan, which is maintained by reason of the arrangement of the overflow-pipe $e^7$, and the supply to the boiling-pan conforms with the flow to the still, while the overflow varies with the adjustment of the valve $f'$.

G is a steam-pipe connected with a source of supply and provided with a suitable valve $g$ for regulating said supply and is connected to one end of the steam-coils $c$, located in the retort C, the other end of the coils being connected to one end of the pipe $g'$. The upper end of this pipe $g'$ is connected with one end of the coil or coils $b'$ in the boiling-pan A, the other end of the coil or coils $b'$ being connected by the pipe $g^2$ to pipe $e^8$, which communicates with the waste-pipe $e^9$. This construction causes the steam to pass through the coils $c$ to vaporize the water in the retort and then passes upward to boil and purify the water in the boiling-pan A, thus utilizing the heat to the best advantage. At $h$ is a pipe provided with a valve or cock $h'$ for cleaning the boiling-pan, and at $h^2$ is a connection provided with a valve $h^3$ for cleaning the water-coil E.

The operation of the apparatus thus constructed is as follows: The cocks $e^{10}$, $h^3$, and $h'$ being closed, the cold water is turned on by opening the cock $e^3$, allowing thereby the circulation of the water through the coil E, pipes $e^4$ $e^5$ $e^6$, to the boiling-pan A, the pipe $e^7$ serving to convey any surplus water through the pipe $e^8$ to the waste-pipe $e^9$. The valve $g$ is now opened and steam permitted to pass through the coils $c$ of the retort and coils $b'$ of the boiling-pan until the thermometer shows a sufficiently high temperature. Then the cock $f'$ is opened and set, which permits the purified boiling water to be supplied to the retort C. The vaporized water will now rise in the dome $c'$ and pass into the pipe D, where it is condensed by the cooling-water in the coil E to approximately the same temperature as said cooling-water, the said condensed water flowing out of the pipe D at $d'$ to and through the saturating-receiver D', from which it may be conveyed in any convenient manner. The cooling-water in the coil E in the meantime absorbs the heat of the evaporated steam, becoming itself heated before reaching the boiling-pan, thereby materially reducing the fuel expenditure. The best results may be obtained by regulating the feed to the retort C by the cock $f'$, so that the water will just about cover the steam-coils, which may be seen through the bull's-eye $c^2$. To shut down, the steam should first be turned off, then the cold water, and after the thermometer $b^2$ falls below one hundred and eighty (180) degrees Fahrenheit then the cock $f'$; otherwise the water in the retort C might vaporize sufficiently to fall below the level of the upper coil.

In distilling all water will deposit more or less scale, according to its condition; so frequent purification and cleansing of the still is most advisable—in fact, necessary for its proper continuous operation—and should be done as often as the precipitation of the solid matter may require. This may be accomplished in any preferred manner—such, for instance, as putting a suitable solvent in the boiling-pan and pipes, preferably through the connection $i$, after shutting off the cocks $e^3$ and $f'$, at the same time keeping steam supplied to the coils. The cock $h^3$ is then opened to let some of the solution run the reverse way through the coil E for about one-quarter of a minute, after which the cock $h^3$ should be closed and the cock $f'$ opened to let as much of the solution run into the retort as the feed-pipe $f$ will empty therein, boiling it thoroughly and allowing it to stand over night, when it may be drawn out. During this cleansing process and when the cooling-water is shut off steam will exhaust at the lower end $d'$ of the condensing-coil D, thereby sterilizing said pipe.

Where poor or very hard water is used, the cooling-water after passing through the coil E may be run first into an additional evaporating or boiling pan with a radiating coil in its bottom, through which exhaust-steam may be caused to pass to raise the water to the temperature of said exhaust-steam. From this pan the preheated water may be fed into the boiling-pan A and from there into the retort C in the manner heretofore explained. The water condensed in the live-steam coil may be run to a hot-water tank placed about on a level with the retort C and, together with the surplus hot water running over from the boiling-pan, may be used to feed a steam-boiler. It will be seen that by the utilization of the heat in the manner explained economy both in the use of live steam and in the use of fuel is thereby secured.

It is obvious that the number of coils for heating and vaporizing the water, or the number of coils for condensing the vaporized water, or the number of boiling-pans or retorts, or their general arrangement or construction may be varied and that other means than steam for heating and vaporizing the water may be employed, also that the saturating-receiver or any other means of supplying gas or sterilized air to the distilled water may be dispensed with, without departing from the spirit of my invention.

In this application I make no claim to the method herein described *per se*, since the same forms the subject-matter of my aforesaid divisional application, Serial No. 29,398, filed September 8, 1900.

Having thus fully described my invention, what I claim as new, and desire to secure by Letters Patent of the United States, is—

1. In a distilling apparatus, the combination with an evaporator and means for vaporizing the water therein, of a condenser comprising water-supply and distillate conduits associated together, an open boiling-pan connected with said water-supply, means for heating said pan to drive off the impurities contained in the water, a pipe connection between the boiling-pan and the evaporator for conducting the remaining heated and purified water to the latter, and a pipe connecting said evaporator to the distillate-conduit of the condenser, substantially as described.

2. In a distilling apparatus, the combination with an evaporator and means for vaporizing the water therein, of a condenser comprising water-supply and distillate conduits associated together, an open boiling-pan connected with said water-supply conduit beyond the point of association with the distillate-conduit, means for heating said pan to drive off the impurities contained in the water, a pipe connection between the boiling-pan and the evaporator for conducting the remaining heated and purified water to the latter, and a pipe connecting said evaporator to the distillate-conduit of the condenser, substantially as described.

3. In a distilling apparatus, the combination with a still, of a boiling-pan provided with an inlet for the water, and an overflow to determine the water-level and maintain the same, said pan having means for boiling the water to purify the same and an opening for the escape of the organic and other gases arising from the boiled water, and a connection for conducting the remaining purified water to said still provided with a valve regulating the supply of water to the still, the supply of water to the boiling-pan being regulated by the amount supplied to said still, substantially as described.

4. In a distilling apparatus, the combination with a still comprising a retort having steam-coils arranged therein for vaporizing water and a condensing pipe or coil communicating with said retort, of a boiling-pan provided with an inlet for the water, a steam coil or coils for heating said water, and an opening for the escape of gases, a pipe connecting said pan to the retort, a pipe or coil surrounding the condensing-pipe, a connection for supplying water to said coil, a pipe leading from the coil surrounding the condensing-pipe, and connected to the inlet of the boiling-pan, together with a pipe connecting the steam-coils of the retort with the coil or coils of said boiling-pan, substantially as described.

5. In a distilling apparatus, the combination of a vaporizing chamber or retort, a boiling-pan communicating therewith to supply the same with boiled water and open for the escape of vapor, a water-supply pipe having a branch communicating with the pan and having an elevated overflow extension beyond such branch to determine the water-level in the pan and maintain it above the water-inlet thereof, and a condenser communicating with the vaporizing-chamber and associated with the water-supply pipe.

6. In a distilling apparatus, the combination with a retort and means for vaporizing the water contained therein, of a boiling-pan provided with an inlet for the water, means for boiling the water contained therein, and with an opening for the escape of the gases, whereby the organic and other gases contained in the water or created by the destruction of solid matter contained therein are driven off with the vapor into the open air, a pipe connecting said pan to the retort for conveying the remaining purified water thereto, a condenser provided with a connection with the retort, a pipe leading from the condenser and supplying heated water to the boiling-pan and provided with an overflow, whereby the supply of water to the pan may be controlled by the amount supplied to the retort, substantially as described.

7. In a distilling apparatus, the combination with a retort and means for vaporizing the water contained therein, of a boiling-pan provided with an inlet for the water, means for heating the water contained in said pan, and an opening for the escape into the open air of the organic or other gases contained in the water or created by the destruction of solid matter contained therein, a pipe connecting said pan to the retort for conveying the remaining purified water to said retort, a pipe or coil surrounding the retort and communicating with the same to receive vapor therefrom, a water-conveying pipe surrounding the condensing-pipe for condensing the distillate, together with a pipe leading from the water-conveying pipe and connected to the inlet of the boiling-pan, whereby the water may be heated by the distillate before being purified, substantially as described.

8. In a distilling apparatus, the combination with a still comprising a retort having steam-coils arranged therein for vaporizing water, and a condensing pipe or coil communicating with said retort, of a boiling-pan provided with an inlet for the water, a steam coil or coils for boiling the water connected with the retort steam-coils, and an opening in the upper portion of the pan for the escape into the open air of the organic and other gases contained in the water or created by the destruction of solid matter contained therein, a pipe connecting said pan to the retort for conveying the remaining purified water to said retort, and a pipe or coil surrounding the condensing-pipe and provided with a communication with the boiling-pan, whereby the water to be distilled may be heated by the distillate before reaching said boiling-pan, substantially as described.

9. In a distilling apparatus, the combination of a vaporizing-retort, a vapor-pipe leading out of the same and coiled about it, one or more steam-coils within the retort, a boiling-pan above the retort and open for the escape of vapors, a steam-coil in said pan and connected in series with the steam-coil in the retort, a pipe connecting the boiling-pan with the retort for supplying the latter with boiled liquid, a liquid-coil inclosing the vapor-coil around the retort, a pipe connecting said liquid-coil with the boiling-pan for supplying the latter with heated liquid, a waste or overflow pipe connected with said hot-liquid pipe, and connections between said waste-pipe and the steam and liquid coils and the retort and boiling-pan, for the purpose described.

In testimony whereof I affix my signature in presence of two witnesses.

JACOB F. WITTEMANN.

Witnesses:
TENNEY ROSS,
CHAS. E. RIORDON.